United States Patent [19]

Zscheile, Jr. et al.

[11] Patent Number: 5,299,229
[45] Date of Patent: Mar. 29, 1994

[54] HIGH RATE-LOW RATE PN CODE TRACKING SYSTEM

[75] Inventors: John W. Zscheile, Jr., Farmington; Alan E. Lundquist; Samuel C. Kingston, both of Salt Lake City, all of Utah

[73] Assignee: Unisys Corporation, Blue Bell, Pa.

[21] Appl. No.: 10,723

[22] Filed: Jan. 29, 1993

[51] Int. Cl.$^5$ .......................................... H04L 27/30
[52] U.S. Cl. ..................................... 375/1; 380/34; 375/115; 370/107
[58] Field of Search .................. 375/1, 115, 107; 380/34; 370/107

[56] References Cited

U.S. PATENT DOCUMENTS

| | | |
|---|---|---|
| 3,665,472 | 5/1972 | Kartchner et al. ............... 375/1 X |
| 4,041,391 | 8/1977 | Deerkoski ........................ 375/1 X |
| 4,119,926 | 10/1978 | Frosch et al. .................... 375/1 X |
| 4,301,537 | 11/1981 | Roos ................................. 375/1 |
| 4,308,617 | 12/1981 | German, Jr. ...................... 375/1 |
| 5,048,053 | 9/1991 | Mower et al. .................... 375/1 |
| 5,099,494 | 3/1992 | Kingston et al. ................. 375/1 |

Primary Examiner—Bernarr E. Gregory
Attorney, Agent, or Firm—John B. Sowell; Mark T. Starr

[57] ABSTRACT

A high PN code rate receiving system is provided for receiving, recovering and tracking a high rate PN composite code comprising a low rate PN code combined with a high rate PN code and wherein the receiving system comprises a broad band receiver for receiving the high rate PN composite code and further includes a data recovery channel and a tracking loop channel. The data recovery channel comprises a high rate mixer and a low rate mixer for removing the high data rate component code and the low data rate component code to provide a low data rate data stream. The tracking loop channel comprises a high rate early-late tracking system for producing a high rate error signal and further comprises a low rate portion of the tracking loop for producing a low rate error signal which is combined with the data output to provide a clock error signal. The clock error signal is applied to a voltage controlled oscillator to produce a low data rate clock and a high data rate clock which are coupled to a low data rate code generator and a high data rate code generator which synchronize the tracking loop and said data channel.

8 Claims, 3 Drawing Sheets

HIGH RATE-LOW RATE PN CODE TRACKING SYSTEM

BACKGROUND OF THE INVENTION

1. Field of the Invention

The present code tracking system relates to digital code tracking systems of the type employed in data link receivers. More particularly, the present invention relates to a novel PN code recovery and tracking system speed having a high speed code recovery and tracking portion superimposed on a low speed code recovery and tracking portion which results in higher PN code rates than was heretofore obtainable.

2. Description of the Prior Art

Heretofore it was known that two or more PN component codes could be combined to create a longer and more complex composite code. Our U.S. Pat. No. 4,809,295 describes a method and apparatus for generating a composite code having correlation properties between the component codes. However, the patent relates to component codes being run on the same clock, thus, are employing the same composite code rate as the component code rate.

In our U.S. Pat. No. 5,099,494, we described a digital demodulator for a PN code receiver. The front end of this receiver was described as being analog for processing real and imaginary signals which were converted to digital signals before being applied to the digital demodulator and digital acquisition and tracking loop. The system described in this patent was implemented in state-of-the-art CMOS technology chips whose PN chip rate is limited to a range of approximately 30 to 70 Mega chips per second.

It is well known that Gallium Arsenide (GaAs) technology chips are now capable of switching at rates of 500 to 1,000 megahertz. Even though GaAs chip technology permits faster switching rates, it is presently impossible to produce GaAs integrated circuit chips having the same density as CMOS chips and it would not be possible to make the digital circuits shown in our aforementioned U.S. Pat. Nos. 5,099,494 using GaAs technology. It would be highly desirable to produce an analog and/or a digital PN code receiver capable of producing PN code rates greatly in excess of the present CMOS limitation rate of 30 to 70 Mega chips per second using present state-of-the-art VLSI CMOS chip technology.

SUMMARY OF THE INVENTION

It is a principal object of the present invention to provide a PN code tracking system for recovering PN coded data at chip rates in excess of 1 gigahertz using digital technology.

It is another object of the present invention to provide a PN code tracking system for receiving PN coded data at chip rates of about 2 gigahertz using analog technology.

It is another principal object of the present invention to generate at a transmitter, a data modulated PN composite code having a chip rate of one to two gigahertz and to provide a novel receiver for receiving, recovering and tracking the high speed data modulated PN code using VSLI digital technology.

It is another principal object of the present invention to provide a novel high rate/low rate PN code tracking recovery system for receiving data modulated PN composite codes and for removing the high speed component PN code leaving the data modulated low speed component PN code for recovery and tracking using low speed semiconductor technology.

It is another object of the present invention to provide a high rate PN code tracking system having a high speed PN code tracking and recovery portion which is implemented in high speed low density semiconductor technology and a low rate PN code tracking and recovery portion which is implemented in low speed, high density semiconductor technology.

According to these and other objects of the present invention there is provided a novel high speed-low speed PN code recovery and tracking system for receiving a composite PN code comprising a high speed PN component code and a low speed PN component code. The high speed recovery and tracking portion recovers the high speed PN component code leaving the data modulated low speed PN component code for recovery and tracking by the low speed tracking and recovery system which is implemented in standard low speed high density VLSI semiconductor devices.

DESCRIPTION OF THE PREFERRED EMBODIMENT

Figure 1:
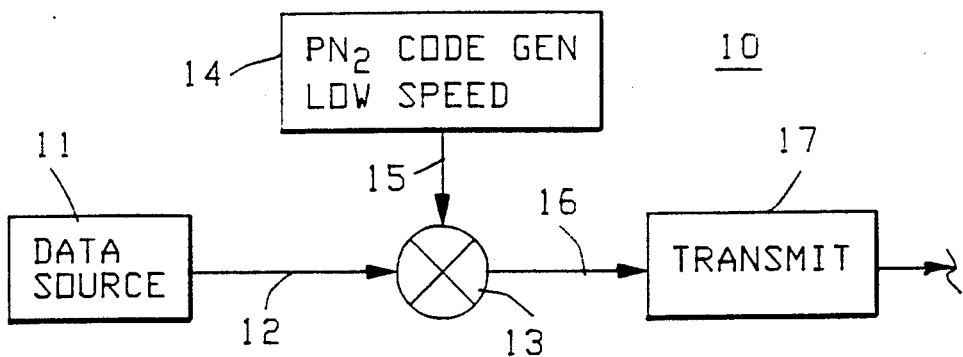
FIG. 1 is a schematic block diagram depicting a prior art low speed PN code transmitting system.

Refer now to FIG. 1 showing a schematic block diagram of a prior art type low speed PN code transmitting system 10 which comprises a data source 11 coupled by line 12 to a mixer 13 which is then coupled to a low speed PN code generator 14 which produces a low speed PN code on line 15 to mixer 13 to produce on line 16 a data modulated PN code which is transmitted by transmitting system 17 to an antenna (not shown).

Figure 2:
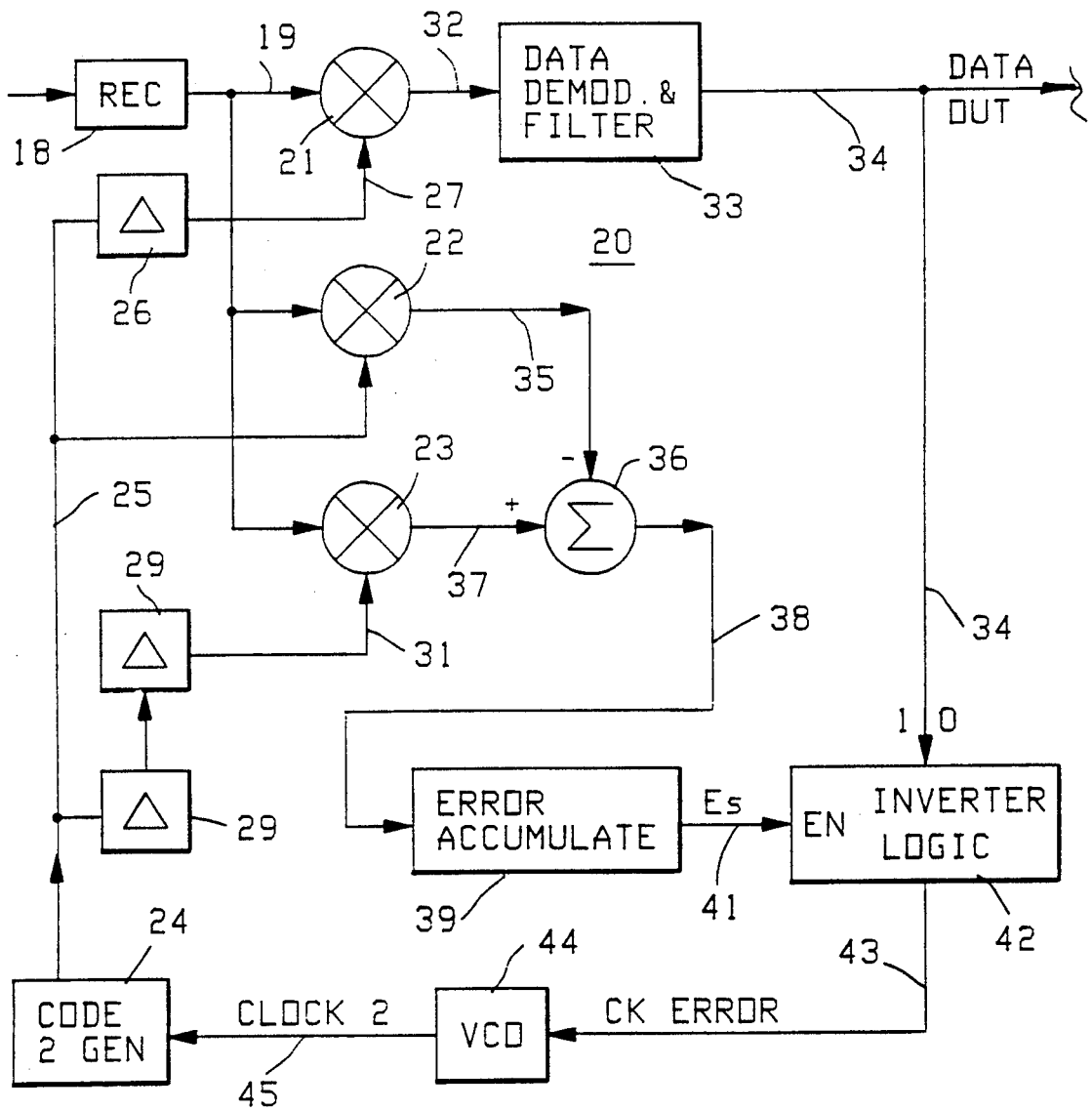
FIG. 2 is a schematic block diagram depicting a prior art system for receiving, recovering and tracking a PN code of the type transmitted by the transmitter of FIG. 1.

Refer now to FIG. 2 showing a a prior art type receiving and recovery system 20 which is capable of receiving the signal transmitted by the transmitter 10 of FIG. 1. The received signal is applied to a receiver system 18 for processing before application via line 19 to mixers 21, 22 and 23 which comprise a part of an early late error tracking system. A low speed code generator 24 provides a low speed PN signal on line 25 which is applied to the mixer 21 via a delay element 26 to provide the on time PN signal on line 27. The PN signal on line 25 is applied directly to the mixer 22 as the early PN signal. Similarly, the PN signal on line 25 is applied to delay elements 28 and 29 to provide the late PN signal on line 31 to mixer 23.

The output of mixer 21 on line 32 is part of the data path which is applied to the demodulator and filter 33 of the type shown in our U.S. Pat. No. 4,808,939 which produces data on output line 34. The output on line 34 is a data decision whether the receive signal is one or zero. The output of the early mixer 22 on line 35 is applied as a negative signal to the summing circuit 36. The output of the late mixer 23 on line 37 is applied to the summing circuit 36 as a positive input causing the output of the summing circuit 36 to produce an error signal on line 38. The error signal on line 38 is accumulated in error accumulator 39 and produces a desired error signal on line 41 which is applied to the enable input of the inverter logic 42. The inverter logic 42 may be implemented in its digital format form by an exclusive or logic circuit. The data on line 34 is passed through inverter logic 42 or inverted so as to provide a one or a zero on line 43 as a clock error signal input to the voltage controlled oscillator 44. The corrected voltage controlled oscillator produces the low speed clock on line 45 which is applied as an input to the low speed code generator 24. The prior art system of FIG. 2 has been explained as a digital system of the type which is shown and described in our U.S. Pat. No. 5,099,494. Having explained a more complex digital system it will be understood that the same receiving, recovery and tracking system may be implemented in analog format without further explanation.

Figure 3:
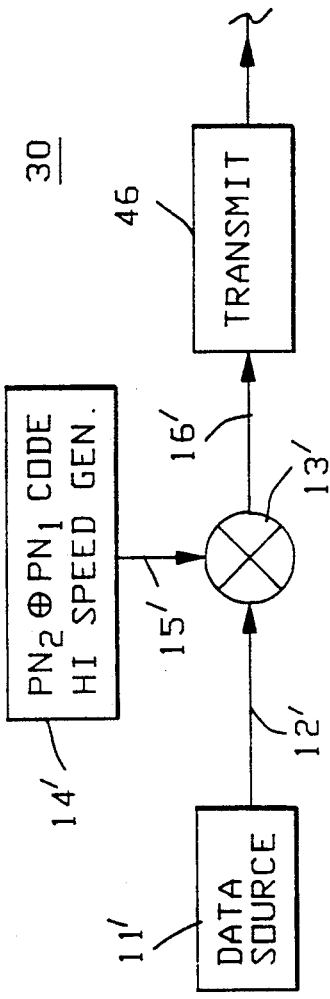
FIG. 3 is a schematic block diagram depicting the present invention composite PN code generator and transmitting system.

Refer now to FIG. 3 showing a schematic block diagram depicting the present invention high speed composite PN code generating and transmitting system 30. The data source 11' may be the same as the data source 11 previously described. The line 12' may also be the same as that shown in FIG. 1. However, the mixer 13' in order to operate at the much higher speed must be implemented in a high speed technology such as Gallium Arsenide. Similarly the high speed generator 14' which combines the component codes PN2 and PN1 must also be implemented in high speed semiconductor technology. The output from mixer 13' on line 16' comprises a composite code of the component codes which is applied to a transmitter 46 which must be a broad band transmitter in order to accommodate the high speed data modulated PN code to be transmitted to the novel receiver to be described hereinafter.

Figure 4:
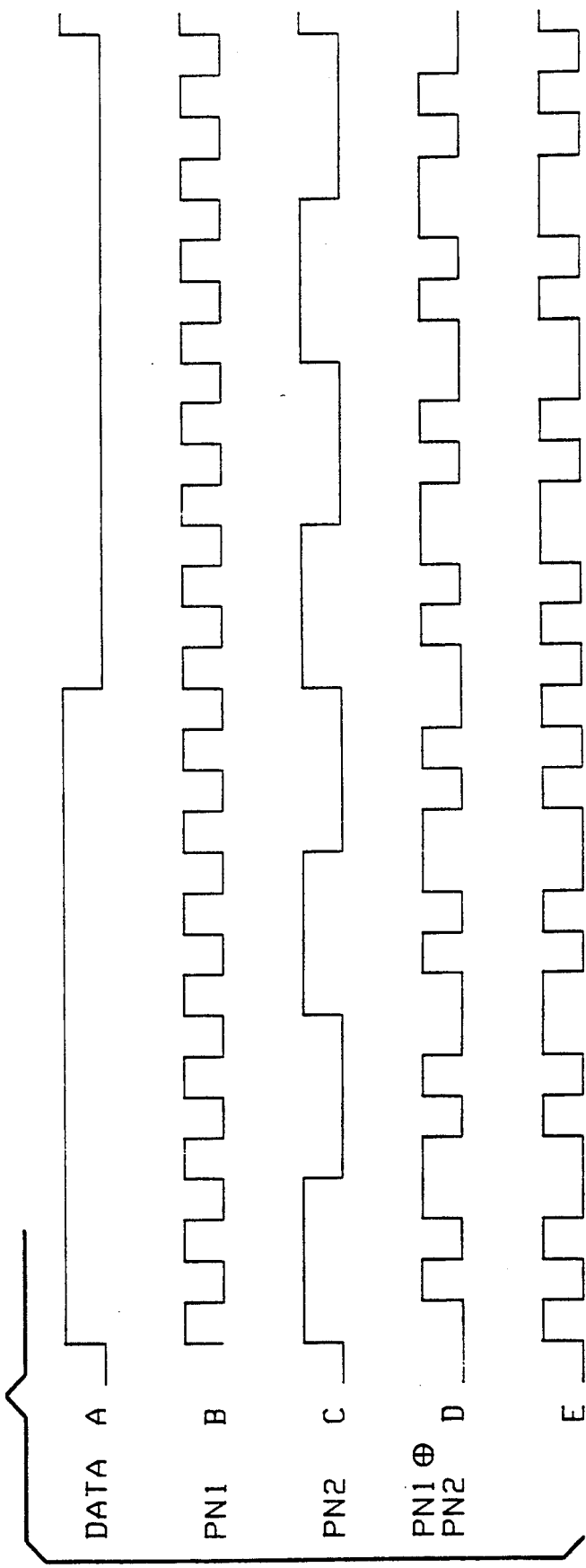
FIG. 4 is a wave form diagram showing the low speed PN code and the high speed PN code and the data modulated composite PN code.

Refer now to FIG. 4 showing five waveforms depicting the PN codes before and after being used to modulate the data shown in FIG. 3. FIG. 4A is representative of the low speed data presented on line 12' to mixer 13'. PN codes PN1 and PN2 are shown in FIGS. 4B and 4C respectively before being exclusive OR combined into a composite code 14' for presentation on line 15' to mixer 13; as shown in FIG. 4D. The data modulated PN composite code on line 16' is shown in FIG. 4E as an output on line 16' for transmission to the receiver to be described hereinafter.

Figure 5:
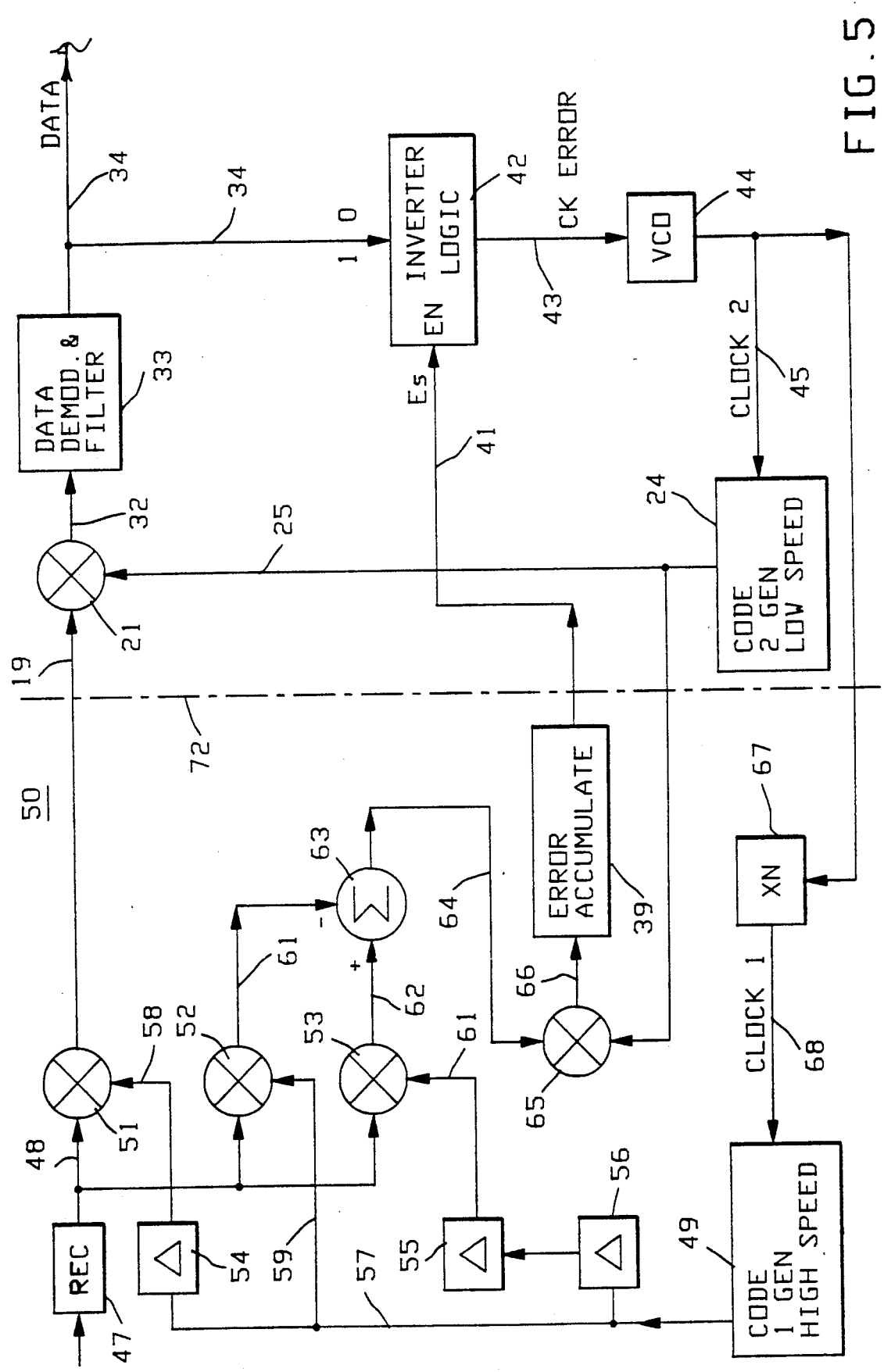
FIG. 5 is a schematic block diagram of the preferred embodiment of the present invention receiving, recovery and tracking system for a high speed composite code transmitted by a transmitter of the type shown in FIG. 3.

Refer now to FIG. 5 showing a schematic block diagram of the preferred embodiment of the present invention receiver, recovery and tracking system for the high speed composite code transmitted by the transmitter 46 of FIG. 3. The system 50 comprises a broad band receiver 47 capable of receiving and processing the data modulated composite code signal transmitted by transmitter 46 and for reproducing the high speed composite code on output line 48 to the high speed mixers 51, 52 and 53 which are preferably implement in Gallium Arsenide semiconductor technology. Similarly, the high speed code generator 49 is preferably implemented in the same Gallium Arsenide semiconductor technology. The delays 54, 55 and 56 are preferably implemented in the same high speed device technology but may be implemented in the form of delay lines or high speed switches. The output from code generator 49 is applied via line 57 direct or via delays 54 to 56 to produce the aforementioned on time signal on line 58, the early signal on line 59 and the late signal on line 61 as described hereinbefore to produce the recovered data modulated PN2 signal on line 19. The early mixer 52 is shown producing a negative correlation signal on line 61 and the late mixer 53 is shown producing a positive correlation signal on line 62 which is applied to a high speed summing circuit 63 to produce an output on line 64 which is applied to an error accumulate logic circuit 39' via line 64, low speed mixer 65 and line 66. The output of prior art type error accumulate logic 39 on line 41 produces the aforementioned error signal $E_s$ which is applied to the prior art type inverter logic 42.

The elements 19, 21, 32, 33, 34, 39, 41 and 42 are preferably identical to those previously described as prior art elements of the type shown in our earlier U.S. Pat. No. 5,099,494. The output of inverter logic 42 on line 43 is an analog error signal similar to that described hereinbefore that is applied to low speed voltage controlled oscillator 44 which produces as an output the low PN2 speed clock on line 45 which is applied to the low speed code generator 24. In order to derive the high speed clock, the signal on line 44 is also applied to a multiply by N circuit 67 which produces the high speed clock on line 68 that is applied to the high speed PN1 code generator 49.

Having explained how the novel receiving, recovering and tracking system for a high speed composite code may be recovered by superimposing discrete elements of high speed logic on a known type of low speed receiving, recovery and tracking system, it will be appreciated that substantial savings are made by using prior art technology such as CMOS digital technology or even CMOS analog technology. The advantage of using such CMOS technology is that it permits very high density at low speeds and includes all of the complex circuitry that is required in the present invention system. The high speed portion shown to the left of separating line 72 has low complexity and low density but extremely high speed. For example, the left side of line 72 may be implemented with the exception of receiver 47 in one Gallium Arsenide gate array and coupled to the more complex low speed circuitry on the right which is implemented in CMOS high density technology.

In the FIG. 5 embodiment, the signal on line 64 is an error signal which includes a low PN code which must be removed before being applied to the inverter logic 42. If the error accumulate logic 39 is implemented as shown, it will produce an error signal Es on line 41 which is chopped by the low rate PN code. Thus, by passing the signal on line 64 through a mixer 65 which also has a low rate PN code input 25, the resulting output on line 41 will produce the same error signal as the prior art system shown in FIG. 2. However, since the mixer 65 is not embodied in data links already produced and in the field it may be desirable to place the low speed mixer 65 in series in front of the error accumulate logic circuit 39 on the high speed logic side and strip off the low rate PN signal before applying the error signal shown on line 66 to the error accumulate circuit 39 which produces on output line 41 the error accumulate signal Es identical to the error signal shown on line 41.

Having explained how all of the new elements required for producing a high rate PN code recovery and tracking system may be placed to the left of line 72, it will be understood that the high speed portion of FIG. 5 may be placed on one circuit card assembly (CCA) and placed in existing data link systems to enable the older data link systems to receive, recovery and track the new high speed composite data modulated PN code which is more jam resistant and less susceptible to undesirable interception. However, if the system is made for a completely new receiver it matters not that the mixer 67 and the error accumulate circuit 39 is placed on the left or the right of the separating line 72 between the high speed and the low speed portions of the system.

For purposes of the present specification and claims the term high rate on high PN code rate as applied to elements of the receiving, recovering and tracking system to the left of line 72 shall mean frequencies well above 100 megahertz and the term low rate or low PN code rate is applied to elements to the right of line 72 which operate below 100 megahertz.

What is claimed is:

1. A high PN code rate receiving system for receiving, recovering and tracking a high rate composite code of two component codes PN1 and PN2, comprising:

high PN code rate recovery means receiving said PN1 and PN2 composite code, high code rate recovery means and tracking means coupled to the output of said receiving means, said high code rate tracking means having a high rate PN1 code generator and a high rate early-late error generator, said high code rate recovery means comprising a high rate mixer coupled to the output of said receiving means and said high rate PN1 code generator to provide a low data rate PN2 code modulated signal, said high rate early-late error generator comprising a pair of high rate mixers having inputs ports coupled to the output of said receiver and to an output of said high rate PN1 code generator, said high rate mixers having outputs coupled to input ports of a high speed summing means to provide a tracking error signal at the output port modulated by said low rate PN2 code, mixer means having input ports coupled to the output port of said summing means and to an output port of a replica source of said PN2 code to provide a tracking error signal at the output of said replica source, low code rate recovery means and tracking means coupled to said high code rate recovery means and said high code rate tracking means, said low code rate recovery means and tracking means comprising a low rate PN2 code generator, low code rate recovery means and a low code rate tracking loop, said low code rate recovery means comprising a low rate mixer coupled to the output of said high rate mixer and to said low rate PN2 code generator to provide a low code rate output signal at the output of said low code rate recovery means, said low code tracking means comprising error logic circuit means coupled to the output of said low code rate recovery means and to the output of said low rate mixer to provide a low rate clock error signal output, and a low rate voltage controlled oscillator (VCO) having an input coupled to said low rate clock error signal output to provide a low rate clock signal on an output which is coupled to said low rate PN2 code generator which generates said PN2 code.

2. A high PN code rate receiving system as set forth in claim 1 wherein said low code rate recovery means, said low code rate tracking means and said low rate PN2 code generator comprise semiconductor devices implemented in high very large scale integrated (VLSI) CMOS devices and said high PN code rate generator, said high code rate recovery means and said high code rate tracking means comprised semiconductors implemented in high code rate semiconductor devices.

3. A high PN code rate receiving system as set forth in claim 2 wherein said high code rate semiconductor devices comprise Gallium Arsenide semiconductor devices.

4. A high PN code rate receiving system as set forth in claim 3 wherein said Gallium Arsenide devices comprise a gate array logic chip coupled to said VLSI CMOS devices.

5. A high PN code rate receiving system as set forth in claim 1 wherein said high code rate tracking means comprises a multiply by N circuit coupled to the output of said low rate voltage controlled oscillator for producing a clock output for synchronizing said high rate PN1 code generator.

6. A high PN code rate receiving system as set forth in claim 1 wherein said low code rate recovery means further includes a low code rate data demodulator and filter means coupled to the output of said low rate mixer for recovering the low code rate data from said PN1 and PN2 composite PN code.

7. A high PN code rate receiving system as set forth in claim 1 wherein the high rate PN1 code has a integral multiple frequency of the low rate PN2 code frequency.

8. A method of transmitting and receiving a high rate composite PN code comprising the steps of:

transmitting a high rate composite PN code comprising the modulo 2 addition of a high rate PN1 code and a low rate PN2 code modulated by low rate data, receiving said composite PN1 and PN2 code in a broad band receiver, stripping off said high rate PN1 code leaving a low rate data modulated PN2 code signal, stripping off said low rate PN2 code leaving a low data rate signal, demodulating said low data rate signal leaving a data signal, recovering a high rate error signal in a high rate tracking loop, generating a low data rate error signal, and generating a low data rate VCO clock signal from said low data rate signal and said low data rate error signal by synchronizing a low data rate VCO, and, generating a high data rate clock signal from said low data rate clock signal by multiplying the low data rate clock signal by a factor N.

* * * * *